United States Patent [19]

Teshima

[11] Patent Number: 4,596,304

[45] Date of Patent: Jun. 24, 1986

[54] EXHAUST SUPPORT SYSTEM

[75] Inventor: Hitoshi Teshima, Aichi, Japan

[73] Assignee: Toyota Jidosha Kabushiki Kaisha, Aichi, Japan

[21] Appl. No.: 660,888

[22] Filed: Oct. 15, 1984

[30] Foreign Application Priority Data

Oct. 14, 1983 [JP] Japan ................ 58-193119

[51] Int. Cl.$^4$ ............................................. B60K 5/04
[52] U.S. Cl. .................................. 180/297; 180/309
[58] Field of Search ................ 180/297, 296, 309, 312

[56] References Cited

U.S. PATENT DOCUMENTS 4,339,919 7/1982 Jobling et al. .................. 180/309 X
4,487,287 12/1984 Watanabe ........................... 180/297

*Primary Examiner*—William E. Wayner
*Attorney, Agent, or Firm*—Parkhurst & Oliff

[57] ABSTRACT

An exhaust support system for a midship engine rear wheel drive-type vehicle having a transversely mounted engine. The exhaust support system has first and second cylindrical exhaust devices which are provided in horizontally separate positions alongside each other. The first exhaust device is connected with an exhaust manifold of the engine by a first exhaust pipe. The second exhaust device is connected with the first exhaust device by a second exhaust pipe. The first exhaust pipe is mounted onto the second exhaust device by a bracket which extends in a perpendicular direction to the longitudinal axes of the first and second exhaust devices. The bracket is made of sheet of a metal, and has a thick thickness.

14 Claims, 11 Drawing Figures

EXHAUST SUPPORT SYSTEM

BACKGROUND OF THE INVENTION

The present invention relates to an exhaust support system for use in a midship engine rear wheel drive-type vehicle, and more particularly to an exhaust support system located between a catalytic converter and a muffler.

In general, a midship engine rear wheel drive-type vehicle, as shown in FIG. 1, has an engine 3 located between a rear axle shaft 1 and a passenger seat 2. In such a vehicle, a nearly equivalent load is exerted on a front axle shaft 4 and the rear axle shaft 1. Hence, the steering control of this vehicle is superior to the steering control of other types of vehicles, resulting in midship engines being installed in many sports cars. To further improve the performance of the steering control in sports cars equipped with midship engines, the lengths $l_1$ and $l_2$ of a front overhang and a rear overhang 5 and 6, respectively, as shown in FIG. 1, are designed to be as short as possible. These short overhangs make it difficult to locate a muffler 7 parallel to the longitudinal direction of the vehicle under the overhang 6 because of the limited size of the rear overhang 6. Hence, in the midship engine rear wheel drive-type sports car of FIG. 10, the muffler 7 is positioned laterally across the vehicle. The reference FWD in FIG. 10 designates a forward direction in the vehicle.

Further, in general, engine vibrations are transmitted through an exhaust pipe to a muffler. If such vibrations are transmitted from the muffler to the vehicle body, the vehicle body vibrates and undesirable noise results in the passenger compartment. This impairs the passenger's comfort. Hence, to absorb the vibration of a muffler, the muffler is mounted through a resilient member onto the body of the vehicle.

In a midship engine rear wheel drive-type vehicle, as shown in FIG. 1, the engine 3 is mounted at a position between the rear axle shaft 1 and the passenger seat 2. The engine 3 is transversely mounted, as shown in FIG. 10, because of the limited longitudinal length of the rear overhang 6. In a vehicle having a transversely mounted engine, a muffler has been mounted onto the vehicle body through a resilient member which is flexible upwardly and downwardly, with a small amount of force. FIG. 10 shows resilient members 12 and 13, which are in the form of disc plates. The members 12 and 13 are located on the same horizontal plane. One end of the members 12 and 13 is fixed to longitudinal ends 10 and 11 of the muffler 7, respectively. A second end of each of the members 12 and 13 is fixed to side members 18 and 19, respectively. The resilient members 12 and 13 are relatively thin in the direction in which they are upwardly and downwardly flexible and therefore bend quite easily in this direction (the upward and downward displacement corresponds to the arrows V—V in FIG. 11).

When the engine 3 is running, it rolls about the axial line N—N of a crank shaft (not shown in drawings) in the direction designated by an arrow C in FIG. 10. In a vehicle having a longitudinally mounted engine, as shown in FIG. 6, the distance "l" between the axial line N—N of the crank shaft and an exhaust pipe 8 is small. While in a vehicle having a transversely mounted engine, as shown in FIG. 7, the distance "L" between the axial line N—N of the crank shaft and a tail end of the exhaust pipe 8 is large. Hence, in the vehicle having a transversely mounted engine, the exhaust pipe 8 amplifies the amplitude of the vibration of the engine roll (the vibration in the direction of the arrows C—C about the axial line N—N in FIG. 7). The amplified engine roll causes the muffler 7 to vibrate upwardly and downwardly with great amplitude. To attenuate this upward and downward vibration of the muffler 7, resilient members similar to the resilient members 12 and 13 have been utilized.

In a vehicle having a transversely mounted engine, the reduction of vibrations in the muffler 7 is accomplished by a vibration absorbing device 9, as shown in FIG. 10. The vibration absorbing device 9 is provided on the exhaust pipe 8, which connects an exhaust manifold of the engine 3 with the muffler 7. The vibration absorbing device 9 absorbs the vibration of the engine 3 and is designed such that it does not transmit the vibration of the engine 3 into the muffler 7. For example, a ball joint can be included in the vibration absorbing device 9. The numeral 14 designates a catalytic converter which purifies the exhaust gas therein. The vibration absorbing device 9 cannot completely absorb the vibration of the engine 3. Hence, the resilient members 12 and 13 are designed to bend upwardly and downwardly with small amounts of force, compared with resilient members in a vehicle having a longitudinally mounted engine.

When a vehicle vibrates because of rough road conditions, the resilient members 12 and 13 will readily bend in an upwardly and downwardly manner (the direction of the arrows V—V in FIG. 9), whenever the muffler 7 and the catalytic converter 14 are displaced upwardly and downwardly because of rough road conditions. The muffler 7 and the catalytic converter 14 individually and collectively have a considerable weight. Hence, the amplitude of the upward and downward vibrations can be considerable. Further, the muffler 7 and the catalytic converter 14 do not always vibrate upwardly and downwardly in phase with each other. Specifically, when the muffler is upwardly displaced, the catalytic converter may be downwardly displaced. When the vehicle is caused to vibrate upwardly and downwardly because of rough road conditions, the engine 3 also vibrates upwardly and downwardly. However, the engine 3 might also vibrate out of phase with the muffler 7 and the catalytic converter 14. Hence, a large relative vertical displacement is possible between the muffler 7, the catalytic coverter 14 and the engine 3. The catalytic converter 14 is located under the muffler 7, as shown in FIG. 11. The axial line M—M of the catalytic converter 14 is provided to be parallel to the axial line L—L of the muffler 7. This layout is determined by the limited size of the vehicle. Further, the catalytic converter 14 and the muffler 7 are directly connected by a U-shaped exhaust pipe 25.

The catalytic converter 14 and the engine 3 is connected by the exhaust pipe 8, upon which the vibration absorbing device 9 is provided. Hence, even if a relative displacement is generated between the catalytic converter 14 and the engine 3, such a displacement is absorbed by the vibration absorbing device 9. This permits the exhaust pipe 8 to escape any damage due to such a displacement. However, if the relative displacement is generated between the catalytic converter 14 and the muffler 7, the exhaust pipe 25 might be subjected to some damage because the catalytic converter 14 and the muffler 7 are connected directly by the exhaust pipe 25.

Hence, according to known techniques, the catalytic converter 14 is mounted through a bracket 26 onto the muffler 7, to prevent a relative displacement between the catalytic converter 14 and the muffler 7 when the assembly is subjected to upward and downward vibrations.

Further, when the temperature increases within the muffler 7 and the catalytic converter 14, the muffler 7 and the catalytic converter 14 expand along their longitudinal directions. During operation of the engine 3, the temperature of the muffler 7 is lower than that of the catalytic converter 14. Hence, the amount of the thermal expansion between the muffler 7 and the catalytic converter 14 will be different. Unless the muffler 7 and the catalytic converter 14 are designed to be slidable with respect to each other, in their longitudinal directions, the exhaust pipe 25 could be damaged.

To avoid the damage of the exhaust pipe 25, the bracket 26, which mounts the catalytic converter 14 onto the muffler 7, is designed to be a thin sheet which extends perpendicular to the axial lines L—L of the muffler 7 and M—M of the catalytic converter 14. This design permits the bracket 26 to bend easily along the axial line M—M thereof, but the bracket 26 cannot easily bend upwardly and downwardly. According to such a design, the damage of the exhaust pipe 25 is prevented even when differential thermal expansion between the muffler 7 and the catalytic converter 14 exists, as well as any upward and downward vibrations.

However, according to the design shown in FIGS. 10 and 11, the following disadvantages are present.

As shown in FIG. 11, the catalytic converter 14 is provided underneath the muffler 7, and further, the bracket 26 extends downwardly. The bracket 26 is made of a sheet of metal. Hence, when the bracket 26 is subjected to a sufficient upward force, the bracket 26 will buckle. If the bracket 26 buckles, the catalytic converter 14 is displaced to a position which is closer to the muffler 7. As a result of this relative displacement, the exhaust pipe 25 might be damaged. Further, the bracket 26 is bent into a L-shaped form and is fixed by a bolt 56 and a nut 57 to the muffler 7. Hence, when the bracket 26 is subjected to a downward force, the portion between the bolt 56 and a bend portion 58 of the L-shaped bracket 26, constitutes a cantilever. Thus, the downward force is amplified due to the cantilever action and the L-shaped bracket 26 readily bends. If the L-shaped bracket 26 downwardly bends, the catalytic converter 14 is downwardly displaced relative to the muffler 7, which also can result in damage to the exhaust pipe 25.

To avoid the above-described disadvantages, one solution to prevent relative displacement between the muffler 7 and the catalytic converter 14 is to increase the thickness of the bracket 26. However, when the thickness of the bracket 26 is increased, the stiffness of the bracket 26 is enhanced in the axial direction M—M thereof. This increased stiffness prevents the relative displacement between the muffler 7 and the catalytic converter 14, generated by the relative thermal expansion differences. Hence, the thickness of the bracket 26 is limited because of the need to compensate for differential thermal expansion between the muffler 7 and the catalytic converter 14.

Another solution to avoid the above-described disadvantages is to provide another vibration absorbing device on the exhaust pipe 25 to absorb the relative displacement between the catalytic converter 14 and the muffler 7. However, according to this solution, two vibration absorbing devices are needed on the exhaust pipes 8 and 25, respectively. This results in an increased production cost.

SUMMARY OF THE INVENTION

The present invention was made in view of the foregoing background and to overcome the foregoing drawbacks. It is accordingly an object of this invention to provide an exhaust support system which prevents exhaust devices from being damaged.

To attain the above objects, an exhaust support system, according to the present invention, is applied in a midship engine rear wheel drive-type vehicle having a transversely mounted engine therein. The exhaust support system includes first and second cylindrical exhaust devices which are provided in horizontally separate positions relative to each other. Further, the first and second cylindrical exhaust devices are located in a parallel relationship with the engine. The first exhaust device is connected with an exhaust manifold of the engine by a first exhaust pipe. The second exhaust device is connected with a first exhaust device by a second exhaust pipe. The first exhaust pipe is mounted onto the second exhaust device by a bracket made of a sheet of metal, which extends perpendicular to both longitudinal axes of the first and second exhaust devices.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
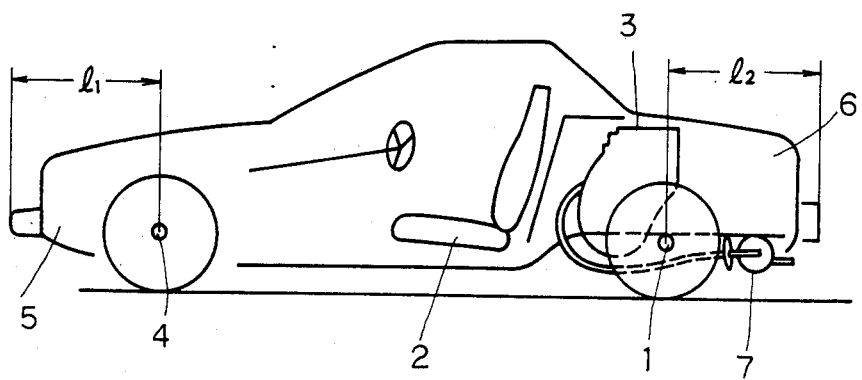
FIG. 1 is a side view of a midship engine rear wheel drive-type vehicle having a transversely mounted engine.
Figure 2:
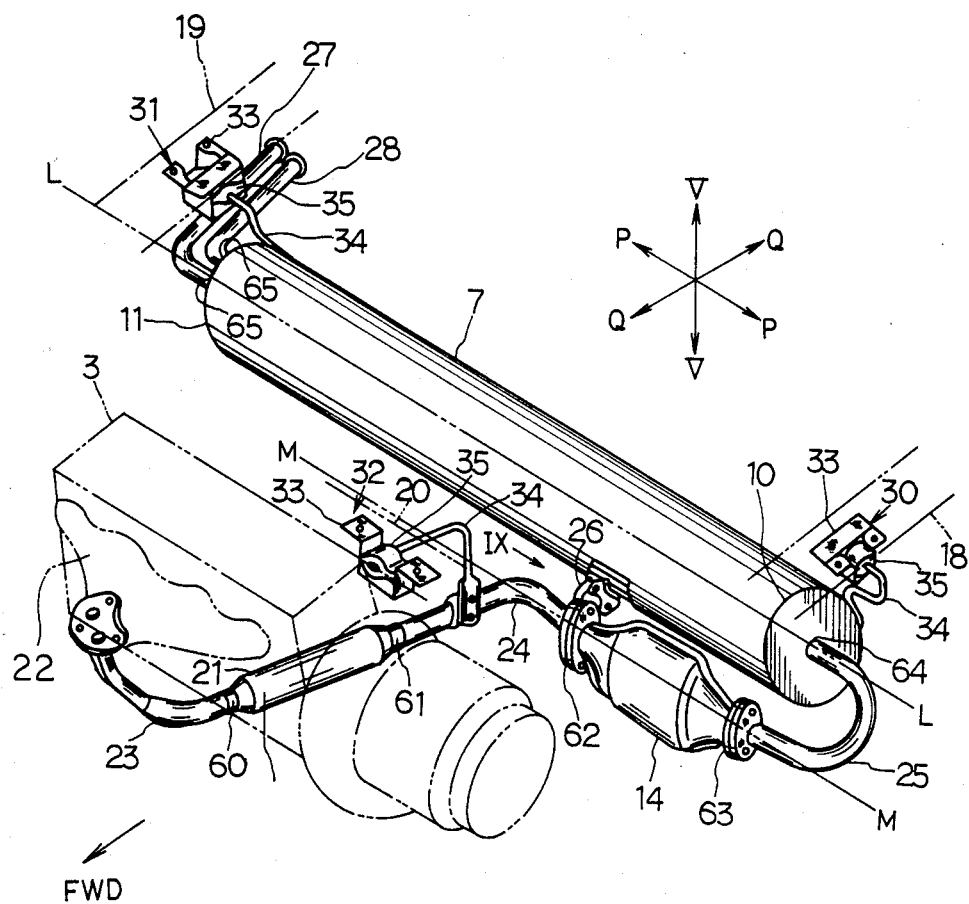
FIG. 2 is perspective view of an exhaust support system according to an embodiment of the present invention.

FIG. 2 shows a perspective view of an exhaust support system according to an embodiment of the present invention. In FIG. 2, the numeral 3 designates an engine installed in a vehicle. The exhaust gas of the engine 3 is supplied through a front exhaust pipe 23 to a vibration absorbing device 21, wherein the vibration of the engine 3 is attenuated. The vibration absorbing device 21 is connected through an intermediate exhaust pipe 24 with a catalytic converter 14, wherein the exhaust gas is purified. The catalytic converter 14 is connected by a rear exhaust pipe 25 with a muffler 7, wherein the noise of the exhaust gas is reduced. After the noise of the exhaust gas is reduced in the muffler 7, the exhaust gas is emitted through tail pipes 27 and 28 to the atmosphere. The exhaust device mounting structure shown in FIG. 2, is employed in a midship engine rear wheel drive-type vehicle, having a transversely mounted engine therein. In FIG. 2, the arrow FWD designates the forward direction in which the vehicle runs. The catalytic converter 14 has a cylindrical shape with an ovular cross-section and extends laterally across the vehicle. The catalytic converter 14 has an inlet opening 62 and an outlet opening 63, at respective longitudinal ends thereof.

The muffler 7 has a cylindrical shape and extends laterally across the vehicle. The muffler 7 is provided with an inlet opening 64 and an outlet openings 65 at respective longitudinal ends thereof. The tail pipes 27 and 28 are connected with the outlet openings 65 of the muffler 7.

The catalytic converter 14 is mounted alongside of the muffler 7 such that the axial line M—M of the catalytic converter 14 is designed to be almost parallel to the axial line L—L of the muffler 7 and the axial lines are located in substantially adjacent horizontal planes. While it is clear from FIG. 2 and FIG. 3 that the axial lines L—L and M—M are not exactly in the same horizontal plane, they are in substantially adjacent horizontal planes. Furthermore, it is possible for the axial lines L—L and M—M to be in the same horizontal plane or relatively displaced such that the axial line M—M is in a horizontal plane vertically above (in the V—V direction) the axial line L—L. An exhaust system for the assembly comprises a front exhaust pipe 23, an intermediate pipe 24 and a rear exhaust pipe 25. The front exhaust pipe 23 connects an exhaust manifold 22 of the engine 3 with an inlet opening 60 of the vibration absorbing device 21. To locate the vibration absorbing device 21 at a position which is as close as possible to the engine 3, the length of the front exhaust pipe 23 is designed to be as short as possible. The front exhaust pipe 23 longitudinally extends in the vehicle.

The intermediate exhaust pipe 24 connects an outlet opening 61 of the vibration absorbing device 21 with the inlet opening 62 of the catalytic converter 14. As the intermediate exhaust pipe 24 approaches the catalytic converter 14 from the vibration absorbing device 21, the intermediate exhaust pipe 24 bends away from the longitudinal direction of the vehicle to the lateral direction in the vehicle. The rear exhaust pipe 25 connects the outlet opening 63 of the catalytic converter 14 with the inlet opening 64 of the muffler 7, and is bent in a U-shaped form.

The vibration absorbing device 21 comprises a flexible bellows tube. The vibration absorbing device 21 absorbs the vibration of the engine 3 by utilizing the flexibility of the bellows tube within the device 21. The device 21 prevents the vibration of the engine 3 from being transmitted through the exhaust pipe 8 to the catalytic converter 14 and the muffler 7.

The muffler 7 is mounted at its longitudinal ends by a first mounting device 30 and a second mounting device 31 onto a rear left side member 18 and a rear right member 19, respectively.

The intermediate exhaust pipe 24 is mounted by a third mounting device 32 onto a rear cross member 20 at a position which extends longitudinally in the vehicle and which is located downstream from the vibration absorbing device 21. The mounting devices 30, 31 and 32 include brackets 33, support rods 34 and resilient members 35 for absorbing a vibration therein, respectively. The brackets 33 are fixed to the vehicle body, specifically, the rear left side member 18, the rear right side member 19 and the rear cross member 20. The support rods 34 are fixed onto the intermediate exhaust pipe 24 or the muffler 7. The resilient members 35 of the mounting devices 30, 31 and 32, are adhered onto the brackets 33. The upper and lower portions of the resilient members 35 are not in contacting engagement with the vehicle body or the brackets 33. This results in the resilient members 35 being very flexible in upward an downward directions.

Figure 3:
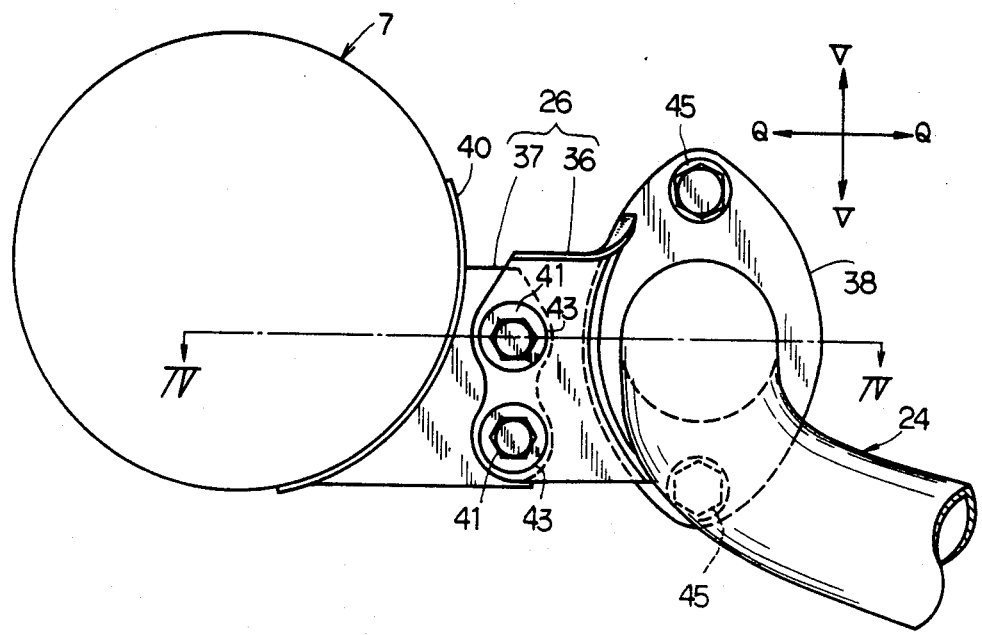
FIG. 3 is an enlarged view of a bracket as viewed in the direction of the arrow IX in FIG. 2.

FIG. 3 shows an enlarged view of the bracket 26 as viewed in the direction of the arrow IX in FIG. 2. In FIG. 3, the directions of the arrows V—V and the Q—Q designate the vertical direction and the longitudinal direction of the vehicle, respectively. The bracket 26 comprises a first bracket 36 and a second bracket 37.

Figure 4:
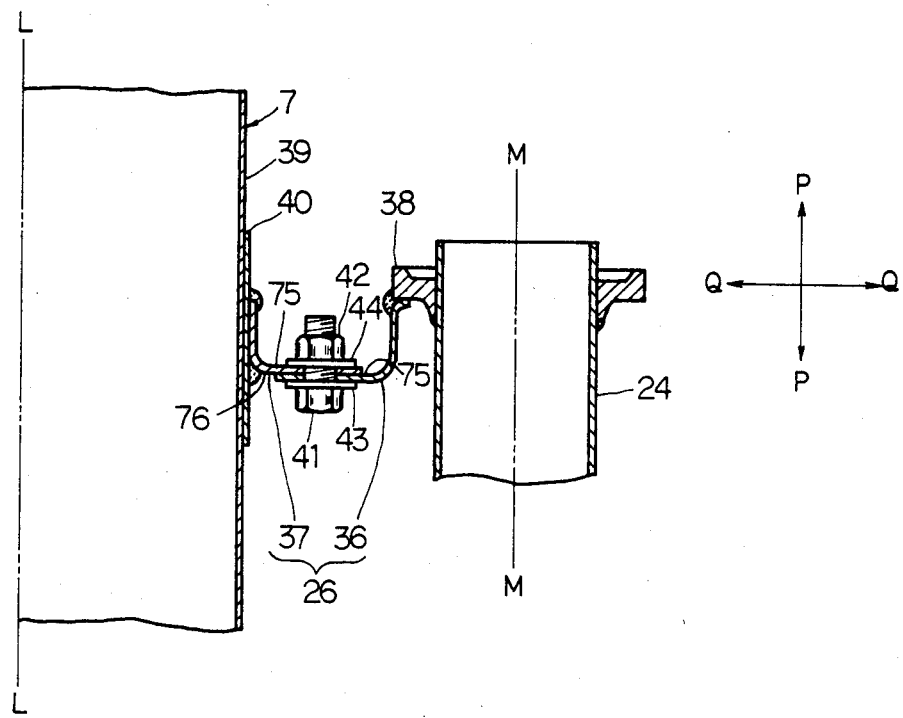
FIG. 4 is a cross-sectional view taken along the line IV—IV in FIG. 3.

FIG. 4 shows a cross-sectional view taken along the line IV—IV in FIG. 3. In FIG. 4, the directions of the arrows P—P and Q—Q designate the transverse and longitudinal directions of the vehicle, respectively. As shown in FIG. 4, the first bracket 36 is welded onto a flange 38 of the intermediate exhaust pipe 24. The flange 38, as shown in FIG. 3, is secured by bolts 45 to the catalytic converter 14. The second bracket 37 is welded onto a reinforcement plate 40 which is welded onto an outer peripheral surface 39 of the muffler 7. The first bracket 36 and the second bracket 37 are fastened together by bolts 41 and nuts 42. The numerals 43 and 44 shown in FIG. 4, designate spring washers. As shown in FIG. 3, the first bracket 36 and the second bracket 37 are fixed at two points which are vertically separated from each other. FIG. 4 shows that the first bracket 36 and second bracket 37 are each made of a sheet of metal, and each bracket extends approximately horizontally. The surface 75 of the first bracket 36 and the surface 76 of the second bracket 37 are positioned approximately perpendicular to the axial line M—M of the catalytic converter 14 and to the axial line L—L of the muffler 7, respectively. Hence the bracket 26 is flexible in the direction of the axial lines M—M and L—L. However, the bracket 26 is very stiff in the vertical direction (the direction of the arrows V—V in FIG. 3).

In the exhaust support system according to the above-described embodiment, as shown in FIG. 2, the catalytic converter 14 extends in an almost parallel relationship with the muffler 7. The bracket 26 has its surfaces 75 and 76 positioned approximately perpendicular to the axial lines M—M and L—L of the catalytic converter 14 and the muffler 7, respectively. Hence, when the bracket 26 is subjected to an upward and downward vibration, the bracket 26 experiences a shear force occurring vertically upon the surfaces 75 and 76.

In general, when comparing a thin plate's resistance to a shearing force which would cause the plate to buckle, against its resistance to a compressive or bending force which also would cause the plate to buckle, the plate is much more resistant to a shearing force.

Figure 8:
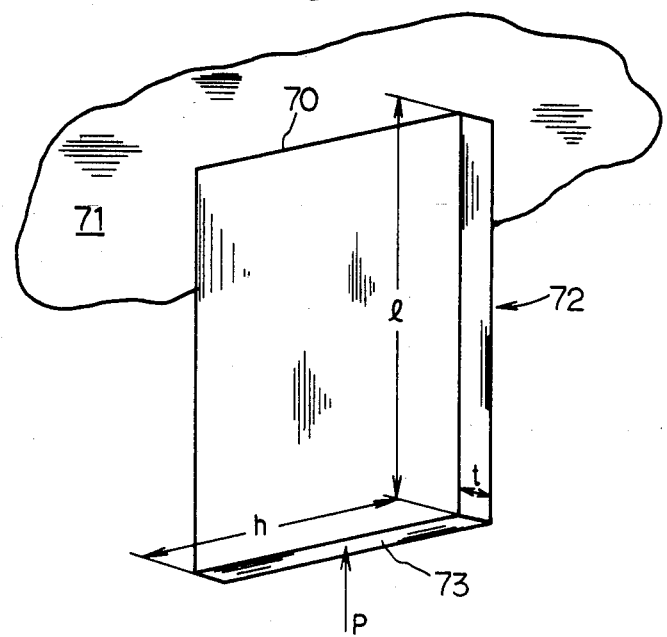
FIG. 8 is a perspective view of a sheet of metal upon which a compressive force is applied.

FIG. 8 illustrates a perspective view of a sheet of metal upon which a compressive force "P" is applied. When the compressive force "P" is applied upon a surface 73 of a thin plate 72, which is secured to another member 71 at another surface 70, the load "P" needed to cause the plate 72 to begin to buckle is defined by the following equation:

$$P = (\pi^2 EI/4l^2) \quad (1)$$

wherein,
P: the compressive load needed to cause the plate 72 to begin to buckle
l: the length of the plate 72
h: the width of the plate 72
t: the thickness of the plate 72
I: the moment of inertia of the plate 72
E: the longitudinal modulus of elasticity of the plate 72

Figure 9:
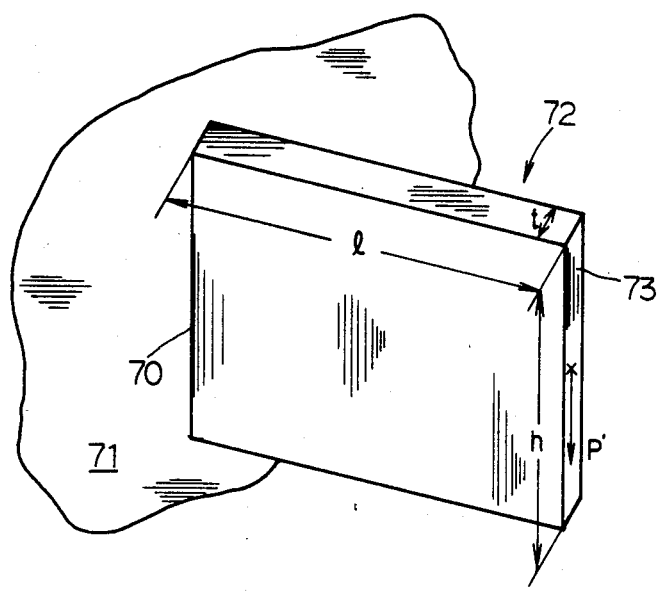
FIG. 9 is a perspective view of a sheet of metal upon which a bending force is applied.
Figure 10:
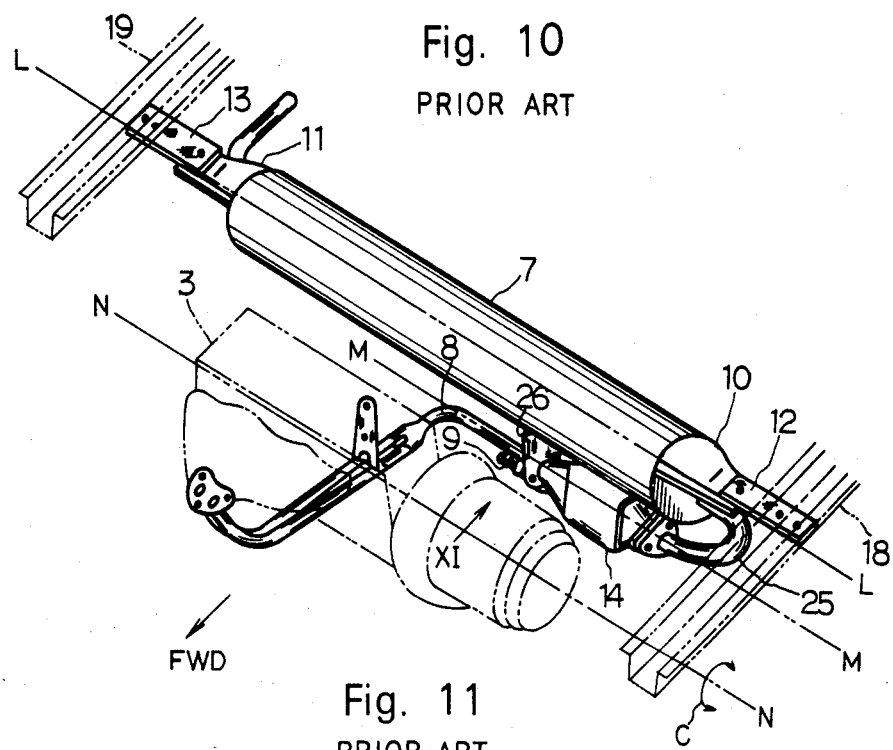
FIG. 10 is a perspective view of a known exhaust support system.
Figure 11:
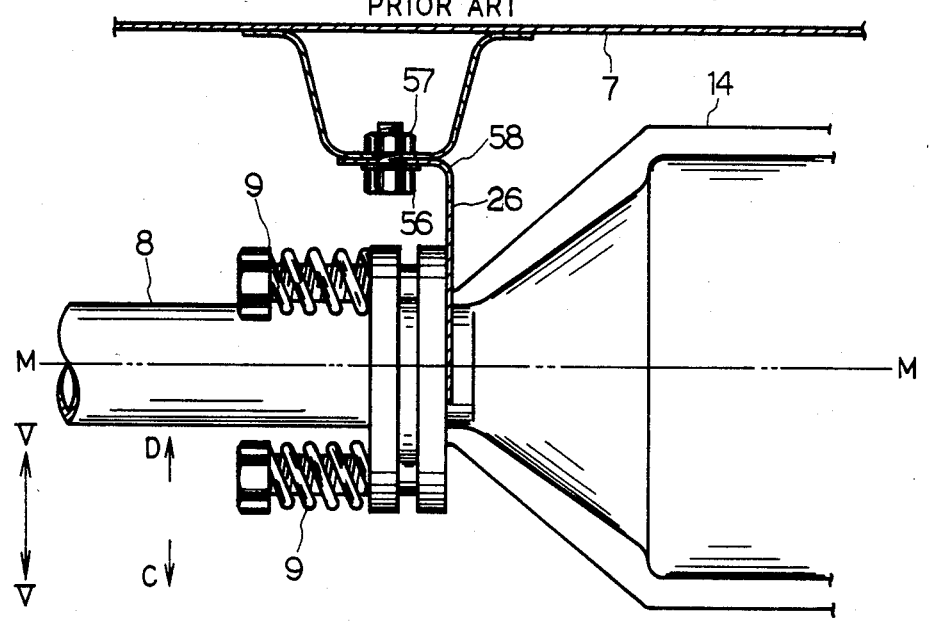
FIG. 11 is an enlarged view of a bracket as viewed in the direction of the arrow XI in FIG. 10.

On the other hand, as shown in FIG. 9, when a shear force is loaded upon a surface 73 of the thin plate 72, which is secured to another member 71 at another surface 70, the load P' needed to cause the plate 72 to begin to buckle is defined by the following equation:

$$P' = (4.01\sqrt{CEI}/l^2) \quad (2)$$

Here,
I = (ht³/12)
C = (Ght³/3)
wherein;
P': the bending load by which the plate 72 commences to buckle
l: the length of the plate 72
h: the width of the plate 72
t: the thickness of the plate 72
I: the moment of inertia of the plate 72
E: the longitudinal modulus of elasticity of the plate 72
C: the torsional stiffness of the plate 72

In general, G is almost equal to 0.4 E. By using the equation G=0.4 E, the following equation is obtained from the above equations (1) and (2):

$$P' = 2.06P \quad (3)$$

As apparent from the above equation (3), the plate 72 can sustain a greater load needed to cause the plate 72 to begin to buckle, when the load is applied onto a member as shown in FIG. 9.

Hence, the bracket 26, according to the present embodiment, has a greater stiffness in its vertically upward and downward direction (the direction of the arrows V—V in FIG. 2), and prevents any relative displacement between the catalytic converter 14 and the muffler 7, when the upward and downward vibration (the vibration in the direction of the arrows V—V in FIG. 2) is applied thereto. Therefore, the present invention obviates the problems experienced by the known exhaust support systems.

Figure 5:
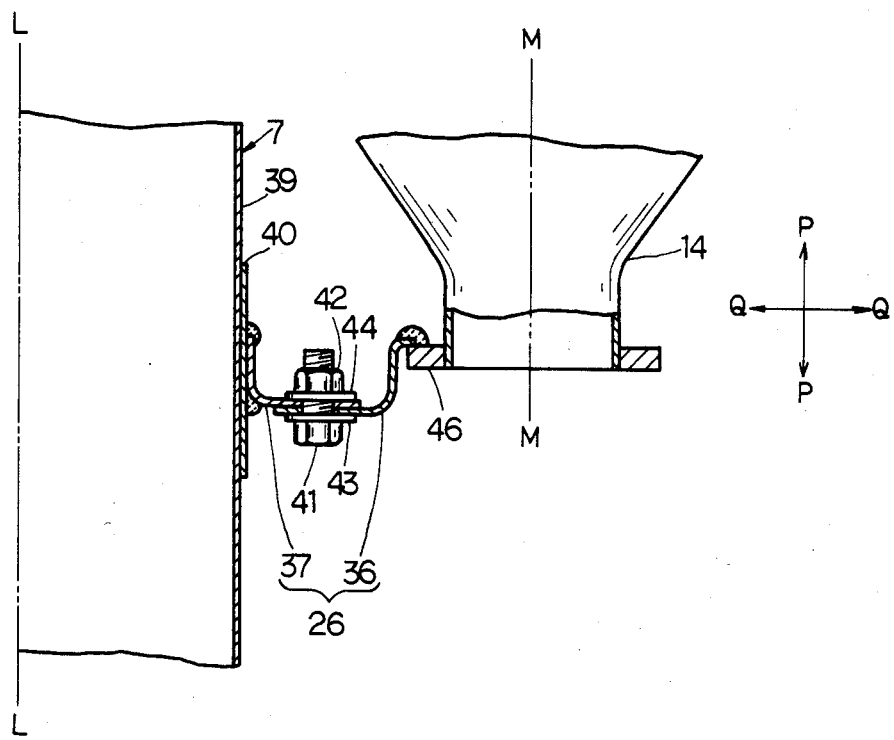
FIG. 5 is a cross-sectional view according to another embodiment corresponding to FIG. 4.
Figure 6:
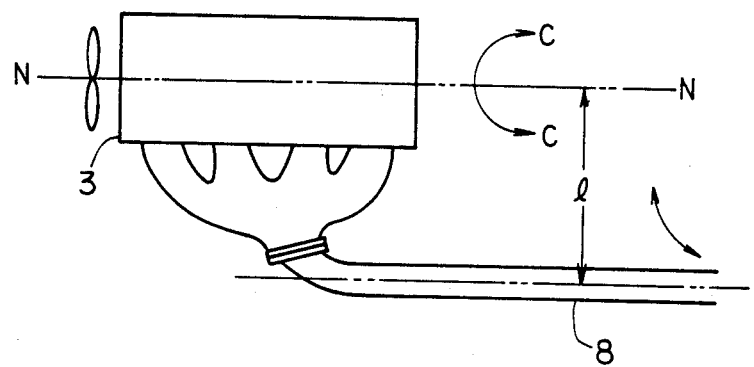
FIG. 6 is a top view which illustrates the positions of an engine and an exhaust pipe in a vehicle having a longitudinally mounted engine therein.
Figure 7:
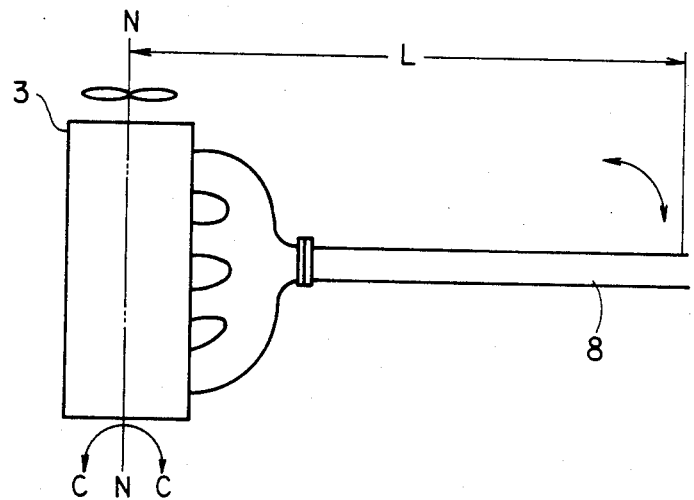
FIG. 7 is a top view which illustrates the positions of an engine and an exhaust pipe in a vehicle having a transversely mounted engine therein.

FIG. 5 shows a cross-sectional view according to another embodiment different from the embodiment shown in FIG. 4. According to this second embodiment, the first bracket 36 is fixed by the welding to a flange 46 on the catalytic converter 14, rather than a flange 38 of the intermediate exhaust pipe as shown in FIG. 4.

While the present invention has been described in its preferred embodiments, it is to be understood that the invention is not limited thereto, and may be otherwise embodied within the scope of the following claims.

What is claimed is:

1. An exhaust support system for a midship engine rear wheel drive-type vehicle having a transversely mounted engine, comprising,
a first cylindrical exhaust device having an inlet opening at a first longitudinal end thereof and an outlet opening at a second longitudinal end thereof and a horizontal longitudinal centerline running therethrough;
a first exhaust pipe having an inlet opening and an outlet opening, said inlet opening communicating with said engine and said outlet opening communicating with said first cylindrical exhaust device;
a second cylindrical exhaust device having an inlet opening at a first longitudinal end thereof an an outlet opening at a second longitudinal end thereof, the second cylindrical exhaust device having a horizontal longitudinal centerline running therethrough and being provided in a substantially parallel relationship with said centerline of said first exhaust device, and said first cylindrical exhaust device is located alongside of said second exhaust device such that said longitudinal centerlines of said first and second exhaust devices are located in substantially adjacent horizontal planes;
a second exhaust pipe communicating the outlet opening of said first exhaust device with the inlet opening of said second exhaust device; and
a bracket means for securing said first exhaust pipe to said second exhaust device, the bracket means being made of at least one sheet of metal, said at least one sheet of metal being secured to an extending perpendicularly between an outer peripheral flange of said first exhaust pipe and an outer peripheral portion of said second exhaust device, said at least one sheet of metal having a substantially flat surface which is substantially perpendicular to said horizontal longitudinal centerlines of said first and said second exhaust devices.

2. The exhaust support system of claim 1, wherein said first exhaust device is a catalytic converter and said second exhaust device is a muffler.

3. The exhaust support system of claim 2, wherein said outer peripheral flange of said first exhaust pipe is located adjacent said inlet opening of said first exhaust device, and said bracket means secures said first exhaust pipe to said second exhaust device through said outer peripheral flange on said first exhaust pipe.

4. The exhaust support system of claim 2, wherein said first exhaust device has an outer peripheral flange located adjacent said first exhaust pipe, and said bracket means secures said first exhaust device to said second exhaust device through the outer peripheral flange on said first exhaust device.

5. The exhaust support system of claim 1 wherein said second bracket is secured to said second exhaust device through a reinforcement plate which is connected to an outer peripheral portion of said second exhaust device.

6. The exhaust support system of claim 5, wherein said fastening means comprises at least one pair of nut and bolt combinations, each nut and bolt combination being vertically separated from another nut and bolt combination.

7. The exhaust support system of claim 1, wherein said second bracket is secured to said said second exhaust device through a reinforcement plate which is connected to an outer peripheral portion of said second exhaust device.

8. The exhaust support system of claim 7, wherein said fastening means comprises at least one pair of nut and bolt combinations, each nut and bolt combination being vertically separated from another nut and bolt combination.

9. An exhaust support system for a midship engine rear wheel drive-type vehicle having a transversely mounted engine, comprising:
a first cylindrical exhaust device having an outlet opening at a first longitudinal end thereof and an outlet opening at a second longitudinal end thereof and a horizontal longitudinal centerline running therethrough;
a first exhaust pipe having an inlet opening and an outlet opening, said inlet opening communicating with said engine and said outlet opening communicating with said first cylindrical exhaust device;
a second cylindrical exhaust device having an inlet opening at a first longitudinal end thereof and an outlet opening at a second longitudinal end thereof, the second cylindrical exhaust device having a horizontal longitudinal centerline running therethrough and being provided in a substantially parallel relationship with said centerline of said first exhaust device, and said first cylindrical exhaust device is located alongside of said second exhaust device such that said longitudinal centerlines of said first and said second exhaust devices are located in substantially adjacent horizontal planes;
a second exhaust pipe communicating the outlet opening of said first exhaust device with the inlet opening of said second exhaust device; and
a bracket means for securing said first exhaust device to said second exhaust device, said bracket means comprising:
a first bracket being secured to and extending from an outer peripheral flange of said first exhaust pipe, said first bracket being perpendicular to said horizontal longitudinal centerlines of said first and second exhaust devices, said first bracket comprising one sheet of metal, said one sheet of metal including a first substantially flat surface;
a second bracket being secured to and extending from an outer peripheral portion of said second exhaust device, said second bracket being perpendicular to said horizontal centerlines of said first and second exhaust devices, said second bracket comprising one sheet of metal, said one sheet of metal including a second substantially flat surface, said second substantially flat surface being in contact with said first substantially flat surface; and
a fastening means for connecting said first bracket to said second bracket, whereby shear force is exerted vertically along said first and second substantially flat surfaces of said first and second brackets.

10. The exhaust support system of claim 9, wherein said first exhaust device is a catalytic converter and said second exhaust device is a muffler.

11. The exhaust support system of claim 10, wherein said first exhaust pipe has an outer peripheral flange located adjacent said inlet opening of said first exhaust device, and said bracket means secures said first exhaust pipe to said second exhaust device through the outer peripheral flange on said first exhaust pipe.

12. The exhaust support system of claim 9, wherein said second bracket is secured to said second exhaust device through a reinforcement plate which is connected to an outer peripheral portion of said second exhaust device.

13. The exhaust support system of claim 12, wherein said fastening means comprises at least one pair of nut and bolt combinations, each nut and bolt combination being vertically separated from another nut and bolt combination.

14. An exhaust support system for a midship engine rear wheel drive-type vehicle having a transversely mounted engine, comprising:
a first cylindrical exhaust device having an inlet opening at a first longitudinal end thereof and an outlet opening at a second longitudinal end thereof and a horizontal longitudinal centerline running therethrough;
a first exhaust pipe having an inlet opening and an outlet opening, said inlet opening communicating with said engine and said outlet opening communicating with said first cylindrical exhaust device;
a second cylindrical exhaust device having an inlet opening at a first longitudinal end thereof and an outlet opening at a second longitudinal end thereof, said second cylindrical exhaust device having a horizontal longitudinal centerline running therethrough and being provided in a substantially parallel relationship with said centerline of said first exhaust device, and said first cylindrical exhaust device being positioned in close proximity to said second exhaust device such that said longitudinal centerline of said first and said second exhaust devices are located in substantially adjacent horizontal planes;
a second exhaust pipe communicating said outlet-opening of said first exhaust device with said inlet opening of said second exhaust device;
a bracket means for securing said first exhaust device to said second exhaust device, said bracket means comprising:
a first bracket being secured to and extending from the outer peripheral flange of said first exhaust pipe, the first bracket being perpendicular to the horizontal planes defined between said longitudinal centerlines of said first and second exhaust devices, the first bracket being made of one sheet of metal, said one sheet of metal having a first substantially flat surface,
a second bracket being secured to and extending from the outer peripheral portion of said second exhaust device, the second bracket being perpendicular to said horizontal longitudinal centerlines of said first and second exhaust devices, the second bracket being made of one sheet of metal said one sheet of metal having a second substantially flat surface, the second substantially flat surface being in contact with the first substantially flat surface, and
a fastening means for connecting said first bracket to said second bracket;
a first absorbing means including a rod, a resilient member and a mounting member, the rod having a first end and second end, the first end of the rod being secured to said first exhaust pipe, the mounting member being secured to an undersurface of a vehicle body, the resilient member connecting the second end of the rod to the mounting member;

a second absorbing means including a rod, a resilient member and a mounting member, the rod having a first end and a second end, the first end of the rod being secured to the first longitudinal end of said second exhaust device, the mounting member being secured to an undersurface of a vehicle body, the resilient member connecting the second end of the rod to the mounting member;

a third absorbing means including a rod, a resilient member and a mounting member, the rod having a first end and a second end, the first end of the rod being secured to the second logitudinal end of said second exhaust device, the mounting member being secured to an undersurface of a vehicle body, the resilient member connecting the second end of the rod to the mounting member, whereby shear force is exerted vertically along the first and second substantially flat surfaces of said first and second brackets on said fastening means.

* * * * *